June 20, 1961 H. A. PANISSIDI 2,989,260

HYDRAULIC DRIVE TAPE HANDLING SYSTEM

Filed Oct. 31, 1956 3 Sheets-Sheet 1

INVENTOR
HUGO A. PANISSIDI
BY
Campbell, Brumbaugh, Free & Graves
HIS ATTORNEYS

INVENTOR
HUGO A. PANISSIDI
BY
Campbell, Brumbaugh, Free & Graves
HIS ATTORNEYS

June 20, 1961 H. A. PANISSIDI 2,989,260

HYDRAULIC DRIVE TAPE HANDLING SYSTEM

Filed Oct. 31, 1956 3 Sheets-Sheet 3

INVENTOR
HUGO A. PANISSIDI
BY
Campbell, Brumbaugh, Free & Graves
HIS ATTORNEYS

United States Patent Office 2,989,260

Patented June 20, 1961

2,989,260

HYDRAULIC DRIVE TAPE HANDLING SYSTEM

Hugo A. Panissidi, Binghamton, N.Y., assignor to International Business Machines Corporation, New York, N.Y., a corporation of New York Filed Oct. 31, 1956, Ser. No. 619,535

12 Claims. (Cl. 242—55.12)

This invention relates to tape handling systems and, more particularly, to a new and improved hydraulic system for accelerating and driving tape carrying members and the like at high rates smoothly and effectively.

In order to improve the performance of computers utilizing magnetic tape, it has been found necessary to increase the speed of the tape and the capacity of the tape reels beyond the capabilities of presently used drive systems. For example, in the computer the tape width has been quadrupled resulting in a 300% greater moment of inertia. In addition, tape velocity has also been increased four times and it was found that such an arrangement requires extremely high power levels and torque for efficient operation.

The electromechanical clutch systems commonly in use have been found incapable of handling tape drive apparatus under the foregoing conditions. Furthermore, the increased tape mass and velocity exaggerated the impact inherent in the operation of such clutch systems which resulted in greatly reduced tape life.

Accordingly, it is an object of the present invention to provide a new and improved high power hydraulic tape handling system capable of extremely rapid acceleration and high velocity.

Another object of the invention is to provide a tape handling system of the above character wherein rapid changes in tape velocity occur smoothly and evenly.

A further object of the invention is to provide new and improved tape handling means having the above characteristics in which pressure lubrication of the operating parts greatly reduces wear and assures a long operating life.

These and other objects of the invention are attained by providing a hydraulic drive system wherein two hydraulic circuits are utilized. More particularly, separate primary high pressure circuits drive a tape capstan and tape reels at the desired rates of acceleration and deceleration. A secondary low pressure circuit associated with each of the primary circuits includes valves controlled by signals from a source such as a computer, the secondary circuit being operable to control valves of the primary high pressure circuit. Thus the high torque and power levels available from high pressure hydraulic system are combined with the low control power required by a low pressure system, the combination affording smooth and highly efficient operation.

Further objects and advantages of the invention will be apparent to those skilled in the art from a reading of the following detailed description taken in conjunction with the accompanying drawings, in which.

Figure 1:
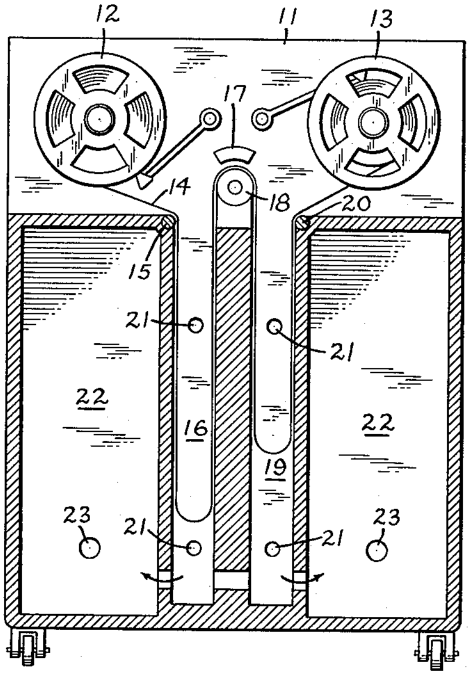
FIG. 1 is an elevation partly in section, and taken along the view line 1—1 of FIG. 2 looking in the direction of the arrows, of a typical high speed tape handling apparatus adapted for use with the invention.

The typical tape handling apparatus illustrated in FIG. 1 by way of example comprises a supporting member 11 on which two tape reels 12 and 13 are rotatably mounted. Magnetic tape 14 from the reel 12 is fed over an air bearing 15 to form a loop in a buffer column 16. A magnetic head 17 is positioned above a capstan 18 that drives the tape 14 between the buffer column 16 and a second buffer column 19, the tape extending therefrom over another air bearing 20 to the reel 13.

Vacuum ports 21 in the two buffer columns 16 and 19 are gated by the tape loops to actuate vacuum or pressure sensitive switches. These switches are part of a tape reel on-off servo system like the ones used in conventional tape drive systems. Surge chambers 22 may be provided between vacuum intake ports 23 and the buffer columns 16 and 19 to accommodate high surge rates with relatively low capacity vacuum pumps.

Figure 2:
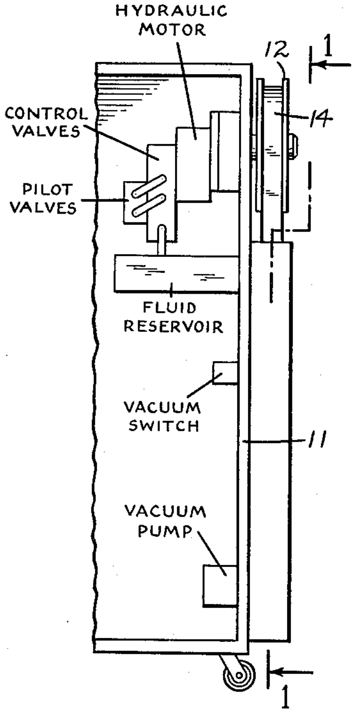
FIG. 2 is a side view of the apparatus of FIG. 1.

The side view of this apparatus shown in FIG. 2 illustrates one arrangement of the components of the hydraulic tape drive mechanism of the invention. In this example the reel 12 is driven by a hydraulic motor mounted on the back of the supporting member 11. The associated control and pilot valves may be arranged in compact form and mounted directly on the motor so that the control time lag resulting from long lengths of piping is substantially eliminated. For example, a system such as the one described herein is capable of accelerating a capstan to full speed in two milliseconds.

Figure 3:
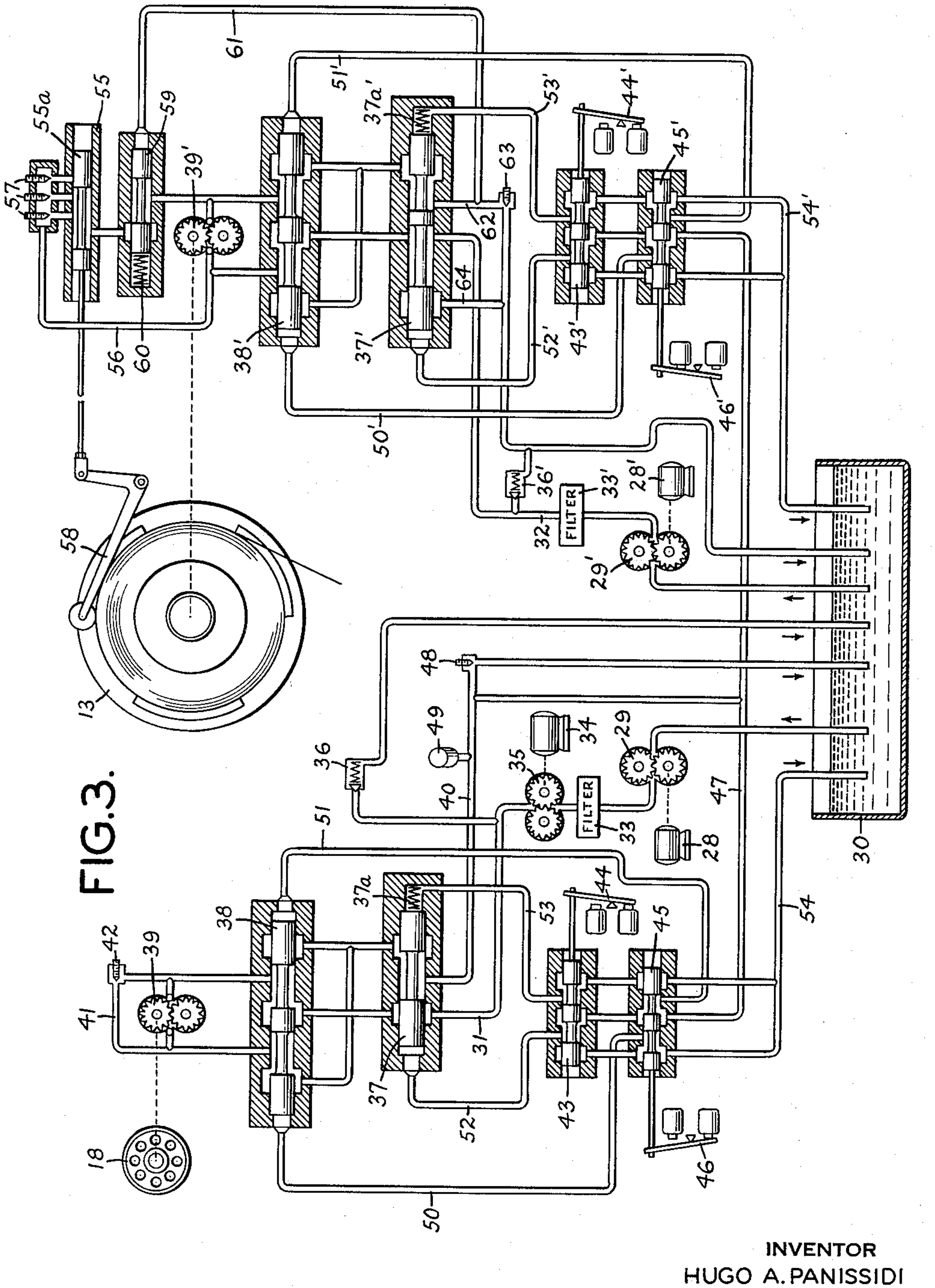
FIG. 3 is a schematic illustration of one embodiment of the hydraulic drive system of the invention.

A typical arrangement of the novel hydraulic tape drive system is shown schematically in FIG. 3. The circuits there illustrated drive the capstan 18 and the tape reel 13, but it will be understood that the circuits described are equally capable of powering any similar drive members.

In the illustrated embodiment two electric motors 28 and 28' drive hydraulic pumps 29 and 29' which pump oil or other hydraulic fluid from a reservoir 30 at high pressure through two supply lines 31 and 32. Filters 33 and 33' may be inserted in these lines to remove impurities from the hydraulic fluid if desired. In order to assure a smooth and uniform flow of fluid to drive the capstan 18, a synchronous motor 34 may be provided to drive a second pump 35 in the supply line 31. Relief valves 36 and 36' coupled to each of the supply lines 31 and 32 assist in maintaining uniform pressure and prevent motor overload.

High pressure fluid in the line 31 is applied to a primary hydraulic circuit including a start-stop control spool valve 37, a direction control spool valve 38 and a hydraulic motor 39 which is mechanically linked to the capstan 18. The direction control valve 38 directs the fluid to either side of the motor 39 according to its position and provides a return path for fluid from the other side of the motor.

When the start-stop valve 37 is open, it passes fluid through the valve 38 to the motor 39, as illustrated in FIG. 3. Moving the valve 37 to the left blocks the fluid return passage from the motor and opens a fluid path from the line 31 to a return line 40. A spring **37*a* may be provided to normally maintain the valve 37** in a closed position.

In order to adjust the speed of the motor 39, a by-pass line 41 includes a needle valve 42 that may be suitably adjusted to control the proportion of diverted fluid.

The secondary lower pressure hydraulic circuit of the capstan drive system controls the positions of the valves 37 and 38 by selectively applying hydraulic pressure across them in a desired direction. This circuit comprises a start-stop pilot spool valve 43, actuated by an armature of a polarized magnet 44 upon signals from a computer (not shown), and a direction pilot spool valve 45 which is similarly actuated by an armature of a polarized magnet 46. A line 47 supplies hydraulic fluid to the secondary circuit from the return line 40 of the high pressure circuit, the fluid pressure in the secondary circuit being substantially lower than that in the primary circuit. A needle valve 48 in the return line 40 controls the secondary circuit pressure while a fluid accumulator 49 in the return line 40 maintains uniform pressure therein.

Two low pressure lines 50 and 51 connect the pilot valve 45 to the ends of the direction control valve 38, the start-stop valve 37 being similarly connected to the pilot valve 43 by two lines 52 and 53. The fluid displaced by operation of the valves 37 and 38 is returned to the reservoir 30 through a return line 54.

The tape reel 13 is driven by a hydraulic system similar in all respects to the system described above, except that an automatic speed control is provided to compensate for varying diameters of tape on the reel. The elements of the reel drive system corresponding to those of the capstan drive are indicated by primed reference numerals in FIG. 3. In the tape reel drive system the polarized magnet 44' is actuated by the tape loops through the vacuum ports 21 shown in FIG. 1.

In order to maintain substantially uniform tape speed, a speed control valve 55 disposed in a by-pass line 56 allows a portion of the fluid to by-pass the hydraulic motor 39'. Three parallel needle valves 57 may be adjusted to obstruct three channels leading to a plunger **55*a* of the speed control valve 55. Varying proportions of the fluid by-pass the motor 39' according to the position of the valve 55 which is controlled by a sensing arm 58 engaging the periphery of the tape on the reel 13**.

Inasmuch as maximum torque is required when the reel 13 is being accelerated to the desired speed, a gate valve 59 in the by-pass line 56 is maintained in a normally closed position by a spring 60 positioned at one end. A line 61 connects the other end of the valve 59 to a return line 62 at the outlet of the start-stop valve 37'. The pressure in the line 61 increases with the speed of the motor and is adjusted by a needle valve 63 so that the valve 59 remains closed until the motor 39' reaches about 75% of the desired speed. An unrestricted outlet 64 leads from the valve 37' so that hydraulic fluid from the input line 32 is by-passed to the reservoir 30 when the valve 37' is in the closed position.

In operation, an electrical signal from a computer applied to the bipolar magnet 44 starts the capstan, the pilot valve 43 being moved to the right to the position illustrated in FIG. 3. Hydraulic fluid applied to the left side of the start-stop control valve 37 through the line 52 drives it open against the spring **37*a*, as illustrated in FIG. 3, and permits fluid from the return side of the direction control valve 38 to enter the return line 40. The fluid from the high pressure input line 31 is thus allowed to pass through the valve 38 to drive the motor 39, the direction of rotation of the motor being determined by the position of the valve 38 which is controlled by the pilot valve 45 in a similar manner. It will be observed that the direction of rotation of the motor can be reversed by shifting the valve 38 without changing the position of the start-stop valve 37**.

A stop signal applied to the magnet 44 displaces the valve 43 to the left which closes valve 37 and blocks the return flow of fluid from the valve 38, the incoming fluid being by-passed to the reservoir through the return line 40. The rapid increase in pressure in the fluid return line from the motor 39 to the valve 37 decelerates the capstan 18 to zero velocity within two milliseconds.

The hydraulic reel drive system operates in a similar manner, the return flow from the motor 39' being directed to the reservoir through the line 62 with the valve 37' in the start position. When the valve 37' returns to the stop position, the input from the line 32' is by-passed to the reservoir through the line 64 and no fluid flows through the line 62. Accordingly, the pressure in the line 61 is reduced and the spring 60 returns the gate valve 59 to the closed position.

As the tape on the reel 13 increases in diameter, the plunger **55*a* of the control valve 55 moves to the right allowing more fluid to by-pass the motor 39' through the parallel needle valves 57** so that the reel speed is reduced.

Figure 4:
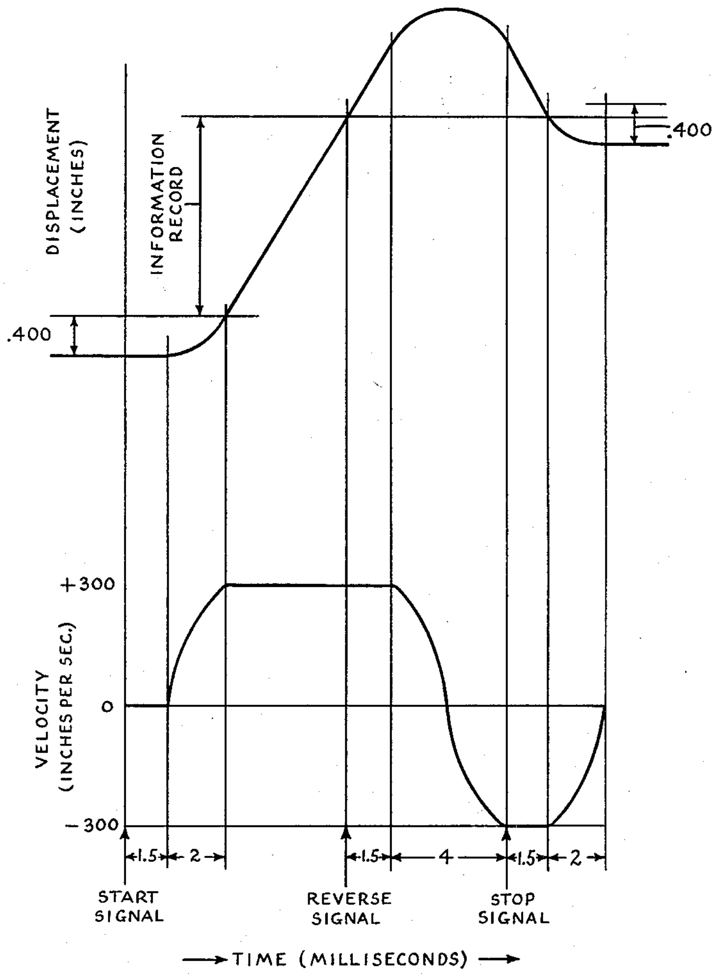
FIG. 4 is a graphical representation of the displacement and velocity response of a drive capstan powered by the hydraulic drive system of the invention.

Referring to the curves of FIG. 4 which illustrate the smooth and efficient performance of the above described embodiment of the invention, a start signal causes the motor to accelerate after a magnet actuation delay of about one and one-half milliseconds. Two milliseconds later, after the tape has moved approximately four-tenths of an inch, the capstan attains full speed, driving the tape at 300 inches per second. Thus, information may be recorded or read from the tape three and one-half milliseconds after the start signal is received.

When the reading or recording has been completed, a reverse signal is applied to the hydraulic drive system bringing the capstan to full speed in the opposite direction within four milliseconds, after an actuation delay of one and one-half milliseconds. A stop signal is received by the drive system at this point and the capstan is decelerated to zero velocity in three and one-half milliseconds, stopping the tape at a position slightly less than four-tenths of an inch before the end of the information record. This reversal permits successive information records to be placed on the tape with minimum spacing by compensating for the motion of the tape during capstan acceleration and deceleration.

It will be apparent from the above that the invention provides novel means for driving a tape system smoothly at high acceleration rates and has the advantages of pressure lubrication for long life and minimum actuation delays.

It will be understood that the embodiment described above is illustrative rather than restrictive of the invention. Various embodiments and changes will be obvious to those skilled in the art which do not exceed the intended scope of the invention as defined in the following claims.

I claim:

1. Hydraulic tape drive apparatus comprising a first hydraulic circuit, a hydraulic motor arranged to drive a reel of tape and at least one control valve included in the first circuit, a second hydraulic circuit, at least one pilot valve means in said second circuit for actuating said control valve with hydraulic pressure from said second circuit, and means responsive to changes in the configuration of the path of the tape for actuating the pilot valve whereby the operation of the hydraulic motor may be controlled.

2. Hydraulic tape drive apparatus comprising a first hydraulic circuit; a reversible hydraulic motor arranged to drive a reel of tape, a start-stop valve and a direction control valve serially connected in the first hydraulic circuit; a second hydraulic circuit, valve means in said second circuit for controlling said start-stop valve and in said direction control valve with hydraulic pressure from the second circuit, and means responsive to changes in the configuration of the path of the tape for actuating the valve means in the second circuit whereby the hydraulic motor may be selectively driven in either direction.

3. Hydraulic take drive apparatus comprising a high pressure hydraulic circuit; a reversible hydraulic motor arranged to drive a reel of take, a start-stop valve and a direction control valve serially connected in the high pressure hydraulic circuit; a lower pressure hydraulic circuit, a start-stop pilot valve in the lower pressure circuit supplying said lower hydraulic pressure to the start-stop valve for controlling its position, a direction pilot valve in the lower pressure circuit for supplying said lower hydraulic pressure to the direction control valve for controlling its position, and means responsive to changes in the configuration of the path of the tape for actuating the pilot valves whereby the hydraulic motor may be selectively driven in either direction.

4. A hydraulic take drive system comprising a hydraulic motor arranged to drive a reel of tape, first hydraulic circuit means for applying hydraulic fluid under pressure to the hydraulic motor including a direction control valve for controlling the direction of rotation of the motor and a start-stop valve for controlling the flow of fluid therein, each of said valves being adapted to be actuated by application of hydraulic pressure, second circuit means including a direction pilot valve for applying fluid under pressure to the direction control valve to actuate the same and a flow pilot valve for applying fluid under pressure to the flow control valve means to actuate the same, means responsive to changes in the configuration of the path of the tape for actuating the pilot valves, a hydraulic pump for applying hydraulic fluid under pressure to the first hydraulic circuit means, and valve means for applying hydraulic fluid from the return side of the first circuit means to the input side of the second circuit means under reduced pressure.

5. In a hydraulic fluid drive system including a hydraulic motor driving a rotary load of generally circular cross-section, motor speed control means comprising a hydraulic circuit for by-passing a portion of the hydraulic fluid around the motor, a valve having a control element, and means connected to the control element for detecting the diameter of the load and displacing the control element in accordance therewith, said valve being responsive to displacement of the control element to alter the flow of fluid in the circuit to maintain a substantially constant peripheral load speed.

6. In a hydraulic fluid drive system for driving a tape reel and including a hydraulic motor, motor speed control means comprising a hydraulic circuit for by-passing a portion of the hydraulic fluid around the motor, a valve having a plunger adapted to control the amount of hydraulic fluid by-passed according to its position, and means responsive to the amount of tape on said reel for adjusting the position of said plunger, whereby the hydraulic motor speed varies in accordance with the amount of tape on the reel.

7. In a hydraulic fluid drive system for driving a tape reel and including a hydraulic motor, motor speed control means comprising a hydraulic circuit for by-passing a portion of the hydraulic fluid around the hydraulic motor, said circuit including a valve having a plunger and a plurality of spaced fluid inlet means adapted to be sequentially opened as said plunger is moved in said valve, and means responsive to the amount of tape on said reel for adjusting the position of the plunger whereby the speed of said motor is varied according to the amount of tape on the reel.

8. In a hydraulic fluid drive system for driving a tape reel and including a hydraulic motor, motor speed control means comprising a hydraulic circuit for by-passing a portion of the hydraulic fluid around the motor, a valve having a plunger adapted to control the amount of hydraulic fluid by-passed according to its position, means responsive to the amount of tape on said reel for adjusting the position of said plunger, whereby the hydraulic motor speed varies in accordance with the amount of tape on the reel, means for obtaining maximum torque from the motor during acceleration of said reel comprising a valve normally biased in a position to prevent passage of the hydraulic fluid through the by-pass circuit, and a valve control circuit at a pressure dependent upon the flow of fluid through the motor, said valve control circuit coupled to said valve to open it when the motor speed attains a predetermined value.

9. Apparatus for hydraulically driving a tape reel comprising a first hydraulic circuit, a reversible hydraulic motor coupled to the tape reel, a start-stop valve and a direction control valve serially connected with the motor in the first hydraulic circuit, a hydraulic fluid by-pass around said motor, a valve in said by-pass to control the amount of diverted fluid, means responsive to the amount of tape on the reel to adjust the by-pass valve, whereby the hydraulic motor speed varies in accordance with the tape on said reel, a second hydraulic circuit, and valve means in said second circuit for controlling said start-stop valve and said direction control valve with hydraulic pressure from the second circuit, whereby the hydraulic motor may be selectively driven in either direction.

10. Apparatus for hydraulically driving a tape reel comprising a high pressure hydraulic circuit, a reversible hydraulic motor coupled to the tape reel, a start-stop valve and a direction control valve serially connected with the motor in the first hydraulic circuit, a hydraulic fluid by-pass around said motor, a valve in said by-pass to control the amount of diverted fluid, means responsive to the amount of tape on the reel to adjust the by-pass valve, whereby the hydraulic motor speed varies in accordance with the diameter of the tape on said reel, a lower pressure hydraulic circuit, a start-stop pilot valve in the lower pressure circuit for supplying said lower hydraulic pressure to the start-stop valve for controlling its position, and a direction pilot valve in the lower pressure circuit for supplying said lower hydraulic pressure to the direction control valve for controlling its position, whereby the hydraulic motor may be selectively driven in either direction.

11. Hydraulic apparatus for driving a tape handling system including two tape reels and a drive capstan comprising a high pressure hydraulic circuit, a lower pressure hydraulic circuit, a reversible hydraulic motor coupled to the drive capstan, a start-stop valve and a direction control valve serially connected with the motor in the high pressure hydraulic circuit, a start-stop pilot valve in the lower pressure circuit for supplying hydraulic pressure from the lower pressure circuit to the start-stop valve for controlling its position, a direction pilot valve in the lower pressure circuit for supplying hydraulic pressure from the lower pressure circuit to the direction control valve for controlling its position, whereby the drive capstan may be selectively driven in either direction, and a drive system for each of the two tape reels comprising a reversible hydraulic motor coupled to the tape reel, a start-stop valve and a direction control valve serially connected with the motor in the reel high pressure hydraulic circuit, a start-stop pilot valve in the reel lower pressure circuit for supplying said lower hydraulic pressure to the start-stop valve for controlling its position, a direction pilot valve in the reel lower pressure circuit for supplying said lower hydraulic pressure to the direction control valve for controlling its position, whereby the tape reel may be selectively driven in either direction, a hydraulic fluid by-pass around the tape reel drive motor, a valve in said by-pass to control the amount of diverted fluid, means responsive to the amount of tape on the reel to adjust the by-pass valve, whereby the hydraulic motor speed varies in accordance with the diameter of the tape on said reel, and means for obtaining maximum torque from the tape drive motor during acceleration of the tape reel comprising a valve normally biased to prevent passage of the hydraulic fluid through the by-pass, and a valve control circuit at a pressure dependent upon the flow of fluid through the reel drive motor, said valve control circuit coupled to said by-pass valve to open it when the motor speed attains a predetermined value.

12. In a hydraulic fluid drive system including a hydraulic motor, a first hydraulic circuit including a supply line and a discharge line for supplying hydraulic fluid to the motor, a second hydraulic circuit connected to the first circuit for by-passing a portion of the hydraulic fluid around the motor to control the speed thereof, means for obtaining maximum torque output from the motor during acceleration comprising a valve normally biased in a position to prevent passage of hydraulic fluid through the second circuit, means for restricting the discharge line of the first hydraulic circuit to produce a pressure therein which is representative of the rate of fluid flow therethrough, and third hydraulic circuit means operatively connected to the valve and joined to the discharge line between the motor and the restricting means to transmit a pressure to the valve dependent upon the rate of flow of fluid through the motor to open the valve when the motor speed attains a predetermined value.

References Cited in the file of this patent

UNITED STATES PATENTS

| | | |
|---|---|---|
| 1,414,941 | Gill | May 2, 1922 |
| 2,192,778 | Stacy | Mar. 5, 1940 |
| 2,331,218 | Montelius | Oct. 5, 1943 |
| 2,380,810 | Wahlmark | July 31, 1945 |
| 2,414,197 | Gignoux | Jan. 14, 1947 |
| 2,596,534 | Crake | May 13, 1952 |
| 2,639,103 | Ball et al. | May 19, 1953 |
| 2,654,548 | Hopkins | Oct. 6, 1953 |